July 1, 1930.  R. FULLER  1,769,638
MOTOR VEHICLE
Filed June 21, 1926    2 Sheets-Sheet 1

Inventor
Rodolphus Fuller,
By
Attorneys

July 1, 1930.   R. FULLER   1,769,638
MOTOR VEHICLE
Filed June 21, 1926   2 Sheets-Sheet 2
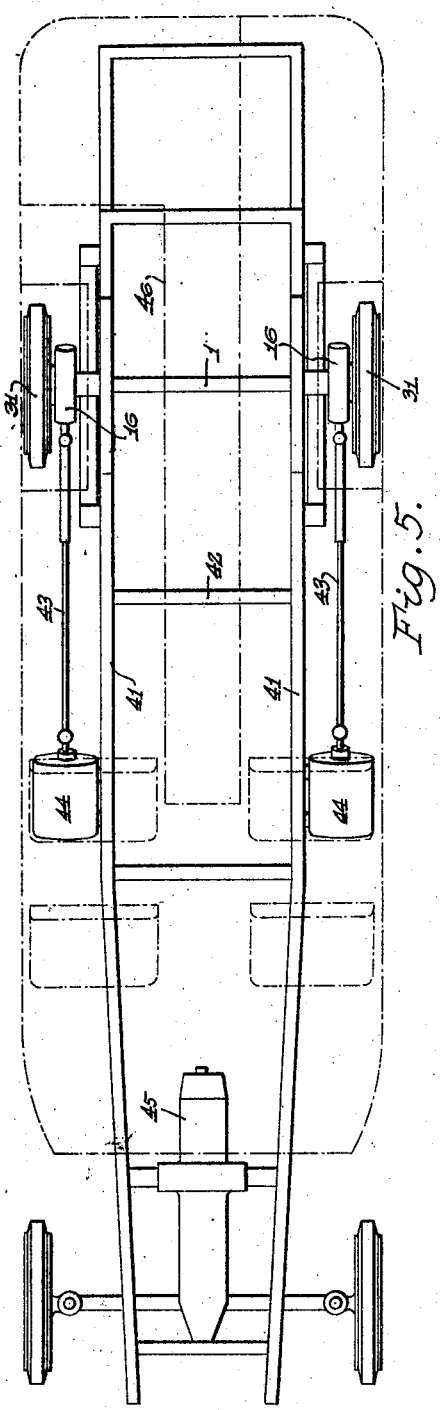
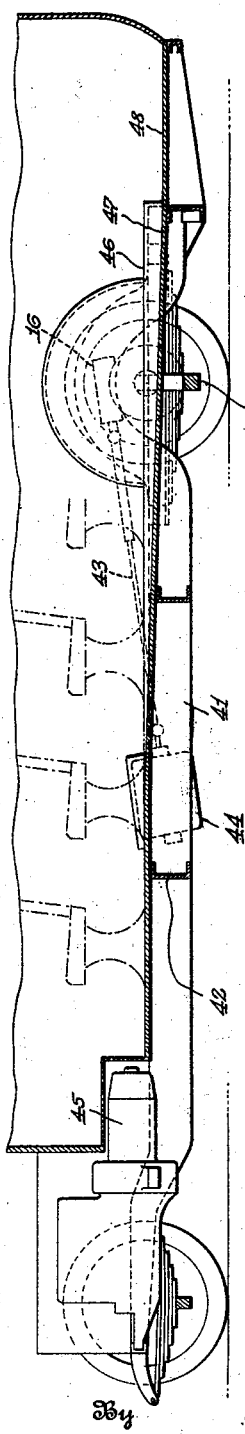
Inventor
Rodolphus Fuller
Attorneys Patented July 1, 1930

1,769,638

UNITED STATES PATENT OFFICE

RODOLPHUS FULLER, OF DETROIT, MICHIGAN

MOTOR VEHICLE

Application filed June 21, 1926. Serial No. 117,329.

This invention relates to bus construction and has special reference to a gasoline electric drive which possesses the advantages of smooth acceleration and quiet operation, the former eliminating jolts and the latter change of gears. In this type of bus it is essential that easy access may be had to the electric drive and I attain this by placing the electric motors outside of the bus chassis and in proximity to the wheels to be driven thereby.

It is also desirable that the floor and platform of the bus be placed as close to the ground as possible to facilitate loading and unloading, and in this connection my invention aims to arrange the electric drive so that there may be a comparatively low floor and platform without the drive interfering with any seating arrangement within the bus body.

My invention also aims to provide a novel wheel hub construction that may be advantageously used in connection with buses and other types of motor driven vehicles, particularly in connection with a two, four or six wheel drive including worms and worm wheels with the former driven from a source of power common to all the wheels of the vehicle or from a source of power for each wheel, and the latter rotatable on an axle spindle for imparting rotation by direct drive, to the hub of a wheel rotatable on the axle spindle.

In motor driven vehicles it is desirable that the wheels be demountable and when the wheels are driven relative to an axle, it is essential that the driving connection be such that a wheel may be bodily removed without any adjustments of a driving connection between the wheel and its source of power. In this invention a novel form of driving connection is employed to establish a positive and reliable drive without any unnecessary stresses or strains on the axle spindle, the drive connection being coaxial of the wheel hub just as though the driven member was an integral part of the wheel hub.

My invention further aims to provide a drive wheel construction on the spindle of an axle provided with a novel arrangement of bearings by which the driving elements are maintained in assembled relation relative to the axle spindle, yet permitting of easy access being had to the driving elements, after the wheel is removed, so that there may be proper lubrication and repair should occasion require.

My invention will be hereinafter specifically described and then claimed and reference will now be had to the drawing, wherein Figure 1 is a vertical longitudinal sectional view of a wheel hub construction in accordance with this invention;

Fig. 5 is a diagrammatic plan of a bus chassis having independent driven wheels, and Fig. 6 is a longitudinal section of the same.

Figure 3:
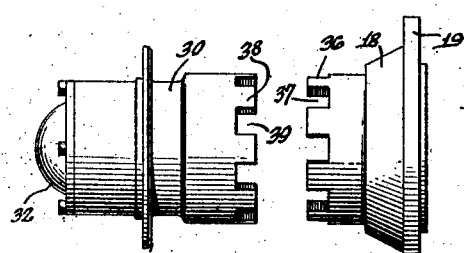
Fig. 3 is a plan of the wheel hub.
Figure 4:
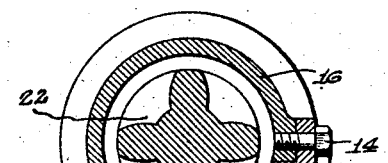
Fig. 4 is a plan of a drive hub adapted to interlock with the wheel hub.
Figure 1:
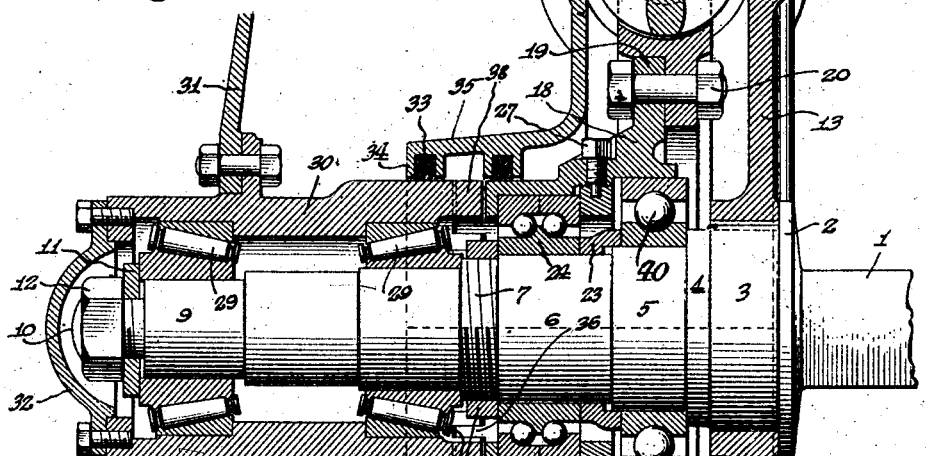

Reference will first be had to Figs. 1 to 4 and for an understanding of my invention there is shown a portion of an axle 1 having an end flange 2 and stepped portions 3, 4, 5, 6, 7, 8, 9 and 10 with the stepped portions 7 and 10 exteriorly screwthreaded and the latter adapted to receive a washer 11 and a nut 12.

Keyed or otherwise mounted on the stepped portion 3 of the axle 1 and abutting the end flange 2 is a housing wall 13 to which is attached, as at 14 a cylindrical two-part housing 15 provided with a tangentially disposed worm casing 16 having end caps 17. On the stepped portion 5 of the axle 1 is an anti-frictional radial bearing 40 supporting a drive hub 18 having a peripheral flange 19 to which is bolted or otherwise connected, as at 20, a worm wheel 21 meshing with a worm 22 rotatable in the worm casing 16 and journaled in the end caps 17 thereof, so that suitable connection may be made with the worm 22 for driving it from a suitable source of power that may be adjacent the axle 1 or remote therefrom. Obviously the worm casing 16 may be on the lower side of the housing 15 so that the drive may be below the axle spindle instead of above it.

The anti-frictional radial bearing 40 abuts the stepped portion 4 of the axle 1 and is retained on the stepped portion 5 by a spacer 23 on the stepped portion 6 of the axle 1 extending onto the stepped portion 5 thereof and against the bearing 40.

Mounted on the stepped portion 6 of the axle 1 against the spacer 23 is a combined end and radial thrust bearing 24 which cooperates with the bearing 40 in supporting the drive hub 18. The bearing 24 is sandwiched between an end flange 25 of the drive hub and a collar 26 screwed into the drive hub and locked thereon by a set screw 27. Retaining the bearing 24 on the stepped portion 6 of the axle 1 is a nut 28 screwed on the stepped portion 7 of the axle 1, and by removing this nut the bearing 24 and other inner parts may be bodily removed from the spindle of the axle.

On the stepped portions 8 and 9 of the axle 1 are anti-frictional roller bearings 29 supporting the hub 30 of a disk wheel 31, said wheel being held against longitudinal movement relative to the axle spindle by the washer 11 and the nut 12, both being enclosed by the outer end of the wheel hub 30 and a cap 32 detachably connected to said wheel hub. Obviously the disk wheel 31 is an example of many types of wheels that may embody my improved hub construction, and the roller and ball bearings are examples of various types of bearing that may be employed for a full-floating type of wheel mounting, to prevent dust and other foreign matter from entering the non-rotatable gear wheel housing 15, dust rings or guards 33 are employed. These rings or guards are mounted in holders 34 carried by a side extension 35 of the housing 15, one of the rings or guards bearing the wheel hub 30 and the other on the drive hub 18.

Figure 2:
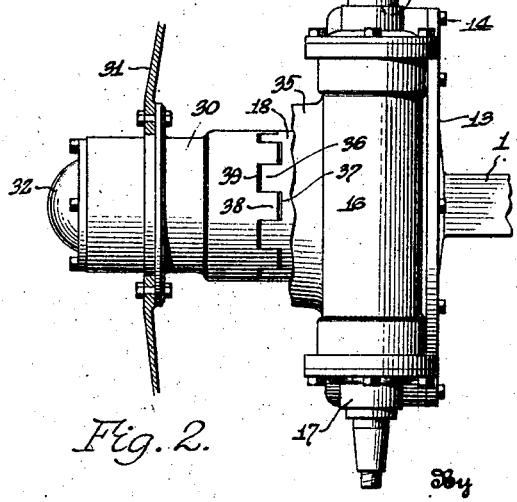
Fig. 2 is a plan of the same on a smaller scale.

Establishing a driving relation between the drive hub 18 and the wheel hub 30 is an interlocking connection at the outer end of the drive hub 18 and the inner hub of the wheel hub 30. On the outer end of the drive hub 18 there is a series of tongues 36 with intervening spaces 37, and on the inner end of the wheel hub 30 is a series of tongues 38 and intervenig spaces 39. The spaces 39 are adapted to receive the tongues 36 and the spaces 37 are adapted to receive the tongues 38 so that the tongues 36 and 38 may cooperate in forming an annular wall substantially as a continuation of the drive and wheel hubs with the tongues interlocking to establish a positive driving relation between the drive hub and wheel hub. This is best shown in Fig. 2 where it will be noted that no circumferential slippage is possible as the wheel hub is driven by the drive hub. The connection is such however, that after the washer 11 and the nut 12 are removed the wheel hub can be slipped off of the axle spindle without displacing any of the drive elements within the housing 15.

Reference will now be had to Figs. 5 and 6 showing the axle 1, wheels 31 and the worm casings 16 as above the axle. These worm casings are between the wheels 31 and the side frames 41 of a bus or other type of vehicle chassis 42. The worms within the casings 16 have extension shafts 43 to electric motors 44 and these motors are suitably supported at the outer sides of the frames 41 so that easy access may be had to the same. The motors are adapted to be electrically connected to a gasoline engine driven electrical generator 45 with suitable controlling devices by which the bus may be operated.

The positioning of the motors 44 and other driving means entirely outside the chassis 41 leaves a clear space between the sides of the chassis. Consequently the floor 46 may be built considerably lower than if various parts of the driving mechanism protruded into the chassis. An inclined aisle or ramp 47 is formed longitudinally and centrally of the floor, sloping downwardly in the rearward direction where it merges into a rear platform 48. This mode of constuction overcomes the necessity of a low and troublesome step between the rear platform and the floor which would otherwise be necessary. As before stated, the worm drive may be below the axle spindles, instead of as shown by dotted lines in Fig. 6, consequently there could be no interference with any seats on the floors 46 extending beyond the sides of the chassis.

What I claim is:—

1. In a bus construction, a chassis, propelling wheels mounted outside said chassis, driving means for said wheels disposed entirely outside the chassis, a substantially level floor on said chassis, a damp formed longitudinally and centrally of said floor and sloping downwardly in a rearward direction, and a rear platform abutting the lower end of said ramp.

2. In a bus construction, a chassis, propelling wheels mounted outside of said chassis, driving means for said wheels disposed entirely outside the chassis, a substantially level floor on said chassis, a ramp formed longitudinally and centrally of said floor and sloping downwardly in a rearward direction, and a rear platform abutting the lower end of said ramp and substantially flush therewith.

In testimony whereof I affix my signature.

RODOLPHUS FULLER.